United States Patent
Wang et al.

(10) Patent No.: US 7,808,552 B1
(45) Date of Patent: Oct. 5, 2010

(54) TECHNIQUES FOR DETECTING A PULLDOWN FIELD SEQUENCE

(75) Inventors: Yuan Wang, Beijing (CN); Song Qiu, Beijing (CN)

(73) Assignees: Vimicro Corporation, Beijing (CN); Wuxi Vimicro Corporation, Wuxi, Jiangsu (CN)

( * ) Notice: Subject to any disclaimer, the term of this patent is extended or adjusted under 35 U.S.C. 154(b) by 1015 days.

(21) Appl. No.: 11/552,524

(22) Filed: Oct. 25, 2006

(51) Int. Cl.
  *H04N 7/01* (2006.01)
  *H04N 11/20* (2006.01)

(52) U.S. Cl. .................... 348/449; 348/448
(58) Field of Classification Search ......... 348/441–459, 348/558, 699–701
See application file for complete search history.

(56) References Cited

U.S. PATENT DOCUMENTS

| | | | |
|---|---|---|---|
| 6,700,622 B2 * | 3/2004 | Adams et al. | 348/448 |
| 6,867,814 B2 * | 3/2005 | Adams et al. | 348/448 |
| 7,129,990 B2 * | 10/2006 | Wredenhagen et al. | 348/449 |
| 7,202,907 B2 * | 4/2007 | Chow | 348/441 |
| 7,215,376 B2 * | 5/2007 | Adams et al. | 348/452 |

* cited by examiner

*Primary Examiner*—M. Lee
(74) *Attorney, Agent, or Firm*—Wuxi Sino IP Agency, Ltd.; Joe Zheng

(57) ABSTRACT

Techniques for distinguishing a pulldown field sequence from a normal field sequence are disclosed. According to one aspect of the techniques, the method for detecting pulldown field sequence comprises receiving a field sequence, combining two adjacent fields into one frame, detecting whether the combined frame has a combing phenomenon, if there is such a combing phenomenon, and determining a number of how many times the combing phenomenon occurs continuously in the combined frame. Based on the number, it can be determined whether the field sequence is a normal field sequence or a pulldown field sequence.

12 Claims, 4 Drawing Sheets

FIG. 3

TECHNIQUES FOR DETECTING A PULLDOWN FIELD SEQUENCE

BACKGROUND

1. Field of the Invention

The present invention relates to the area of image signal processing, and more particularly to techniques for detecting a pulldown field sequence.

2. Description of Related Art

To satisfy the broadcast and display requirements of television programs, a progressive scan frame signal should be converted into an interlaced scan field signal. There are two traditional methods to solve this problem. One of the methods is that either all even line data or all odd lines data in each frame image is reserved as single-field data with the rest of the lines data discarded. As a result, a sequence of field data is generated and considered as a normal field sequence. The other one of the methods needs to employ a pulldown conversion technique which depends on a ratio of inputting frame ratio N to outputting field ratio M. Referring to FIG. 1, the most popular one is a 2:2 pulldown conversion, which means each frame image is divided into one odd field data and one even field data with the lines of the odd field interleaved with the lines of the even field. The alternating odd and even fields produced by the 2:2 pulldown conversion is named as a 2:2 pulldown field sequence.

The 2:2 pulldown conversion is adapted on condition that the field ratio M is twice of the frame ratio N or nearly twice. For example, when a film program running at 24 frame/second needs to be played on a television device in PAL standard which operates at 50 field/second, the following operation should be performed: converting the film program with 24 frame/second into the 2:2 pulldown field sequence with 48 field/second; broadening the 2:2 pulldown field sequence with 48 field/second into the field sequence with 50 frame/second; playing the field sequence with 50 frame/second on the TV device in PAL standard.

On the other end, in order to make up the lost odd or even lines data in the interlaced scan field signal and satisfy the resolution requirement, the interlaced scan field signal should be de-interlaced into the progressive scan frame signal before being played back on a progressive scan display device. There are a lot of conventional ways to de-interlace the interlaced scan field signal, such as an intra-field processing method, an inter-field processing method and a motion-adaptive method and etc. It is also well known that each of the de-interlaced methods may perform differently with respect to a different type of interlaced scan field signals. For example, each field of a normal field sequence records image information at a unique time with one half of the information lost, hence there is a need to recover the lost information when de-interlacing the normal field sequence. While the pulldown field sequence records integral image information, the de-interlaced method therefor may be quite different from that for the normal field sequence.

The interlaced scan signal in common use is a mixed video stream which not only comprises a pulldown field sequence but also a normal field sequence, hence a different de-interlaced method requires to be selected for the pulldown field sequence and the normal field sequence.

Therefore, there is a need for distinguishing the pulldown field sequence from the normal field sequence.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for distinguishing a pulldown field sequence from a normal field sequence. According to one aspect of the present invention, a pulldown field sequence is detected in accordance with the following operations: receiving a field sequence, combining two adjacent fields into one frame, detecting whether the combined frame has a combing phenomenon, if there is such a combing phenomenon, and determining a number of how many times the combing phenomenon occurs continuously in the combined frame. Based on the number, it can be determined whether the field sequence is a normal field sequence or a pulldown field sequence.

According to another aspect of the present invention, an energy ratio of each of at least some of the pixel blocks is calculated to determine whether a combined frame has the combing phenomenon. The energy ratio is defined to be energy of a highest frequency in a total energy of whole frequencies in one pixel block. If the energy ratio is greater than or equal to the ratio threshold, it can be concluded that there is a combing phenomenon in the pixel block. To ensure the accuracy, a number of the pixel blocks that have the combing phenomenon are recorded. If the number of the pixel blocks is greater than or equal to a comb block threshold, it can be concluded that the combined frame has the combing phenomenon.

The present invention may be implemented in software, hardware or a combination of both. According to one embodiment, the present invention is a method for detecting a pulldown field sequence, the method comprises receiving a field sequence, combining two adjacent fields into one frame, detecting whether the combined frame has a combing phenomenon, if there is such a combing phenomenon, determining a number of how many times the combing phenomenon occurs continuously in the combined frame, and determining the field sequence to be a normal field sequence or a pulldown field sequence according to the number.

According to another embodiment, the present invention is a video de-interlacing device, the device comprises a storage module for buffering an interlaced scan signal, a detector for determining the interlacing scan signal from the storage module is whether a normal field sequence or a pulldown field sequence, a de-interlacing module for de-interlacing the interlaced scan signal from the storage module into a progressive scan signal, the detector informing the de-interlacing module of determined result, and the de-interlacing module selecting corresponding ways for the normal field sequence and the pulldown field sequence; and wherein the detector determines the interlacing scan signal by: receiving a field sequence orderly; combining two adjacent fields into one frame; detecting whether combined frames have comb; obtaining a rule of comb occurring on the combined frames; determining the field sequence as whether a normal field sequence or a pulldown field sequence according to the rule of comb occurring on the combined frames.

One of the objects, features, and advantages is to provide techniques of detecting a pulldown sequence.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 3 is an exemplary schematic diagram showing how to divide a frame image into plural pixel blocks.

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Embodiments of the present invention are discussed herein with reference to FIGS. 1-4. However, those skilled in the art will readily appreciate that the detailed description given herein with respect to these figures is for explanatory purposes only as the invention extends beyond these limited embodiments.

According to one embodiment, a pulldown field sequence is obtained by converting a progressive scan frame signal running at N frame/second into an interlaced scan field signal running at M field/second. During signal conversion, each frame of the progressive scan frame signal is divided into one odd field and one even field with the lines of the odd field interleaved with the lines of the even field, and the odd and even fields are further duplicated or abandoned according to the relationship between the frame ratio N and the field ratio M. The frame ratio N may be 24 frames/second, the field ratio M may be 50 fields/second, 60 fields/second or other commonly used field ratio.

Figure 1:
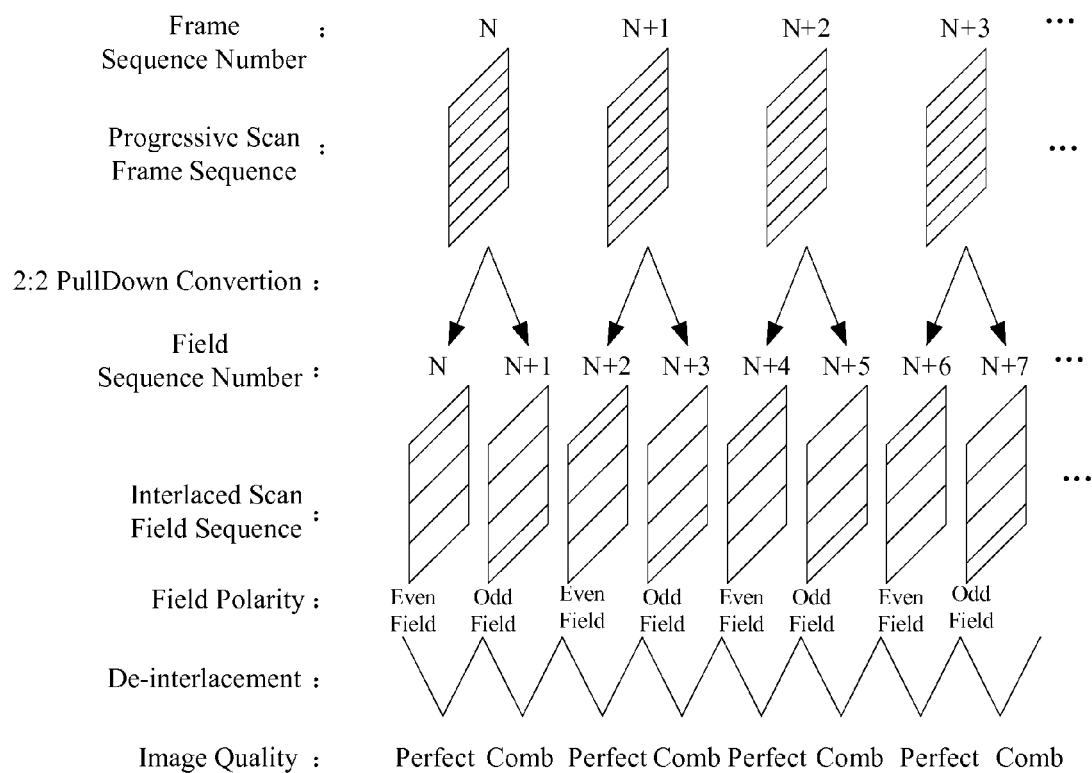
FIG. 1 is a diagram showing a 2:2 pulldown field sequence.

When M=2N, referring to FIG. 1, the 2:2 pulldown field sequence is so generated that the duplicated or abandoned operation is not needed. When M>2N, the duplicated operation is needed to obtain duplicate fields. For example, a 3:2 pulldown field sequence is generated by following operations: dividing the frame signal running at 24 frame/second into a field signal running at 48 field/second with the odd field and the even field alternating, getting one duplicated field every 4 fields in the field signal in order to expand the field signal at 48 field/second into the field signal at 60 field/second. When M<2N, the abandoned operation is needed to cancel redundant fields. For example, if the current frame ratio N is 30 frame/second, the object field ratio M is 50 field/second, the field sequence at 60 field/second is generated after the dividing operation, one field is required to be abandoned every 6 fields.

Figure 2:
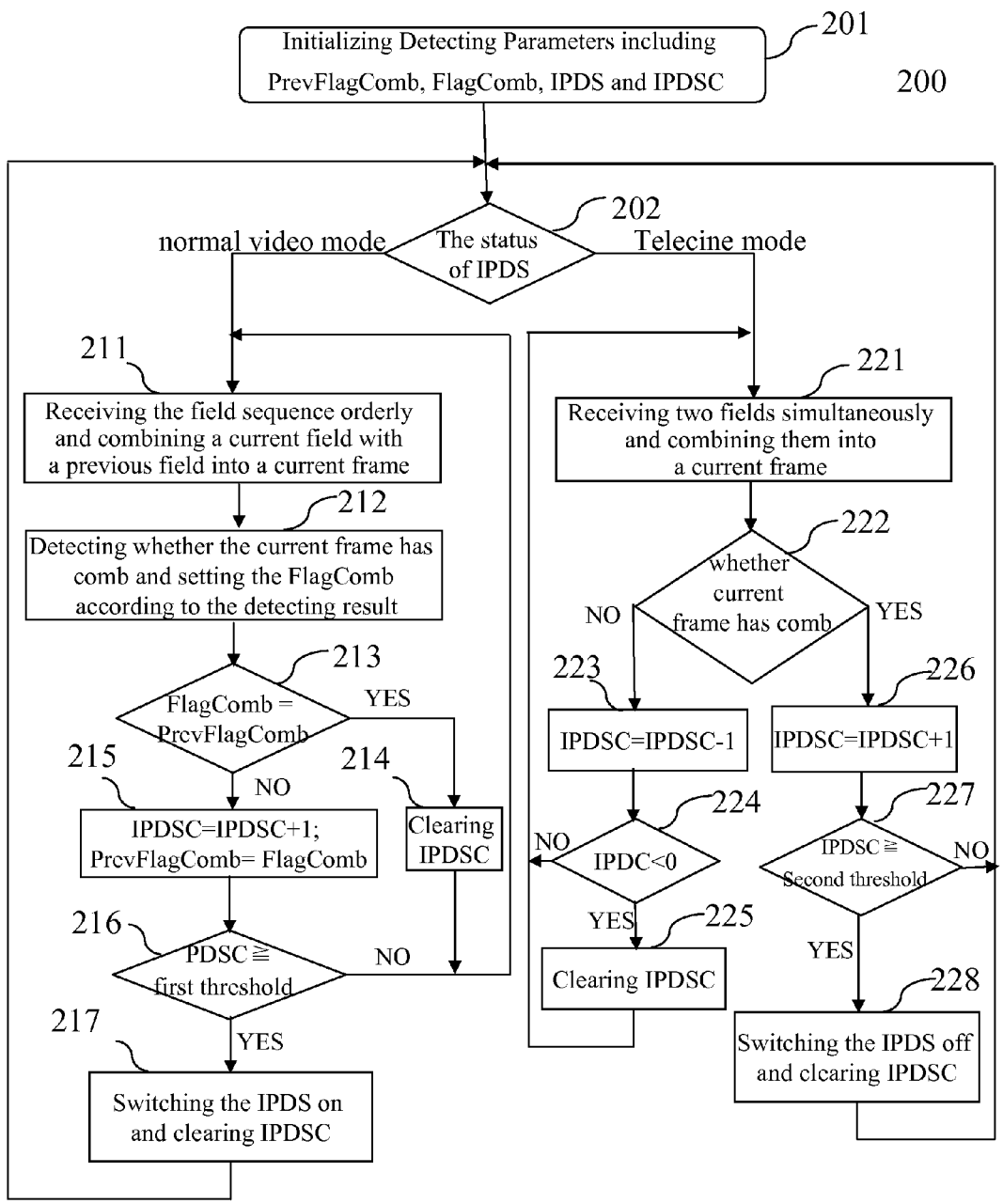
FIG. 2 is a flowchart or process of detecting a 2:2 pulldown field sequence according to one embodiment of the present invention.

A technique for distinguishing a 2:2 pulldown field sequence from a normal field sequence is provided as an example to introduce aspects of the present invention. Referring now to FIG. 2, there shows a process 200 of detecting a pulldown field sequence from a normal field sequence. At 201, a plurality of parameters is initialized. The parameters, also referred to as detecting parameters, include a previous frame comb flag (PrevFlagComb) indicating whether there is a combing phenomenon in a previous frame, a current frame comb flag (FlagComb) indicating whether there is a combing phenomenon in a current frame, an inverse pulldown switch (IPDS) and an inverse pulldown switch counter (IPDSC). In one embodiment, the initialization sets PrevFlagComb=0, FlagComb=0, IPDS=off, and IPDSC=default.

The process 200 now moves to 202 where a working mode is determined according to the status of the IPDS. If the IPDS is switched off (e.g., IPDS=off), the process 200 goes to a normal video mode, otherwise, the process 200 goes to a telecine mode. It is now assumed that IPDS=off, the process 200 goes to the normal video mode.

The normal video mode begins at 211, where a mixed field sequence is received in sequence and a current field is combined with a previous field into the current frame. Then, whether the current frame has a combing phenomenon is detected and FlagComb is set accordingly as a result of the detecting result at 212. If the detecting result at 212 shows YES (i.e., there is a combing phenomenon), FlagComb is set to 1, otherwise FlagComb is set to 0. At 213, whether FlagComb is equal to PrevFlagComb is determined. If they are equal to each other, which means that the 2:2 pulldown field sequence can not be detected in the current video stream because the combing phenomenon always alternatively occurs on the ordinal combined frames of the 2:2 pulldown field sequence in the motion scene. The normal video mode returns to 211 after IPDSC is cleared at 214, otherwise it means that the current field sequence is likely to be the 2:2 pulldown field sequence, IPDSC is added by 1 and PrevFlagComb is replaced by the value of FlagComb at 215.

At 216, whether IPDSC is greater than or equal to a first threshold is determined. If YES, the field sequence is distinguished as a 2:2 pulldown field sequence, the process 200 moves to 217 where IPDS is switched on and IPDSC is cleared, otherwise, the field sequence is distinguished as the normal field sequence, and the process 200 returns to 211. As described above, it can be appreciated that IPDSC has indicated a number of hoe many times "YES" and "NO" alternates, where "YES" means there is a combing phenomenon, "NO" means there is no combing phenomenon. Clearing IPDSC means that the number is recounted.

If the IPDS is switched on (e.g., IPDS=on), the process 200 goes to the telecine mode that begins at 221 where two adjacent fields are simultaneously received from a mixed field sequence and combined together into the current frame. At 222, whether the current frame has a combing phenomenon is determined. If there is no such combing phenomenon, which means that the current field sequence may be the 2:2 pulldown field sequence but not the normal field sequence because the combing phenomenon always occurs on the ordinal combined frames of the normal field sequence, IPDSC is subtracted by 1 at 223. Then, whether IPDSC is less than 0 is determined at 224, the NO branch returns to 221, the YES branch goes to 225 where IPDSC is cleared and then the telecine mode returns to 221.

If there is a combing phenomenon, which means that the current field sequence is likely to be the normal field sequence, IPDSC is added by 1 at 226 and then compared with a second threshold at 227. If IPDSC is greater than or equal to the second threshold, IPDS is switched off and IPDSC is cleared at 228, then the process 200 returns to 202.

As described above, it is well known that the frame combined by two fields formed from one common frame should have no combing phenomenon. Likewise, the frame combined by two fields formed from different frames should have the combing phenomenon so that the combing phenomenon always occurs alternatively on the ordinal combined frames for the 2:2 pulldown field sequence and always occurs on every combined frames for the normal field sequence. Thus, it can be observed that a process for detecting the 2:2 pulldown field sequence is divided into two branches according to status of IPDS, one branches going to the normal video mode, the other going to the telecine mode.

The normal video mode generally comprises receiving a field sequence orderly, combining every two adjacent fields into one frame, detecting whether the combined frame has a combing phenomenon, obtaining a number of how many times "YES" and "NO" continue to occur alternatively on the combined frames by comparing FlagComb with PreFlagComb, only when the number exceeds a first threshold, the field sequence is determined as the 2:2 pulldown field sequence.

The telecine mode generally comprises: receiving two adjacent fields simultaneously and combining the two fields into one frame, detecting whether the combined frame has a combing phenomenon, obtaining a number of how many times "YES" and "NO" occurs continuously, only when the number exceeds a second threshold, the field sequence is determined as the normal field sequence.

The first and second thresholds may be pre-defined by an operator depending on implementation. The values of the first and second threshold may influence the performance of the distinguishing method described above. The larger the two thresholds are, the more reliable the distinguishing result is, but the slower the distinguishing speed may be. In one embodiment, the first threshold is set between 25-100, and the second threshold is set between 1-10.

Referring now back to FIG. 1, an occurring rule of the combing phenomenon for the 2:2 pulldown field sequence is to cycle "NO, YES" and the minimum cycle is 2 in the above embodiment, IPDSC is provided for recording the alternative occurring number of "YES" and "NO" for the combing phenomenon at normal video mode. It can be observed that IPDSC may also be provided for recording the cycle times of the combing phenomenon in another embodiment.

It should be noted that the present invention may be adapted not only for distinguishing the 2:2 pulldown field sequence but also for distinguishing other pulldown field sequence, such as 3:2, 3:3 and etc. For example, the occurring rule of the combing phenomenon for the 3:2 pulldown field sequence should be to cycle "NO, NO, YES, NO YES" and the minimum cycle is 5. IPDSC is provided for recording the cycle times of "NO, NO, YES, NO YES" which the combing phenomenon continuous to occur in this embodiment. When the cycle number exceeds the first threshold, the field sequence is determined as the 3:2 pulldown field sequence. The occurring rule of the combing phenomenon for the 3:3 pulldown field sequence should be to cycle "NO, NO, YES" and the minimum cycle is 3, where IPDSC is provided for recording the cycle times of "NO, NO, YES" which the combing phenomenon continuous to occur in this embodiment. When the cycle number exceeds the first threshold, the field sequence is determined as the 3:3 pulldown field sequence.

In one embodiment in which there is a 24:1 pulldown field sequence (for converting 24 frame/sec film to 50 field/sec), the occurring rule of the combing phenomenon should be to cycle "NO, YES, NO YES, NO, YES, NO YES, NO, YES, NO YES, NO, YES, NO YES, NO, YES, NO YES, NO, YES, NO, NO, YES" and the minimum cycle is 25. IPDSC is provided for recording the cycle times of "NO, YES, NO YES, NO, YES, NO YES, NO, YES, NO YES, NO, YES, NO YES, NO, YES, NO, NO, YES" in this embodiment, when the cycle number exceeds the first threshold, the field sequence is determined as the 24:1 pulldown field sequence.

It can be observed that different types of pulldown field sequence may have a different minimum cycle. As a result, when the distinguishing speed is invariable, the smaller the minimum cycle is, the larger the first threshold should be set. In other words, the value range for the first threshold is relative to a type of the pulldown field sequence. For the 3:2 pulldown field sequence, the first threshold may be set between 3-24. For the 3:3 pulldown field sequence, the first threshold may be set between 12-48. For 24:1 pulldown field sequence, the first threshold may be set between 3-20. It is well known that the second threshold is provided for detecting the normal field sequence and does not change as the type of pulldown field sequence changes.

For further understanding the present invention, the way how to detect whether the combined frame has a combing phenomenon is described. The combing phenomenon means that pixel values have fast oscillation along the vertical direction. Based on the sampling theorem, the oscillation frequency is equal to the highest frequency allowed at the vertical direction in the image sampling and being one half of the sampling frequency. According to one embodiment, the way for detecting combing phenomenon comprises the following operations.

Figure 3:
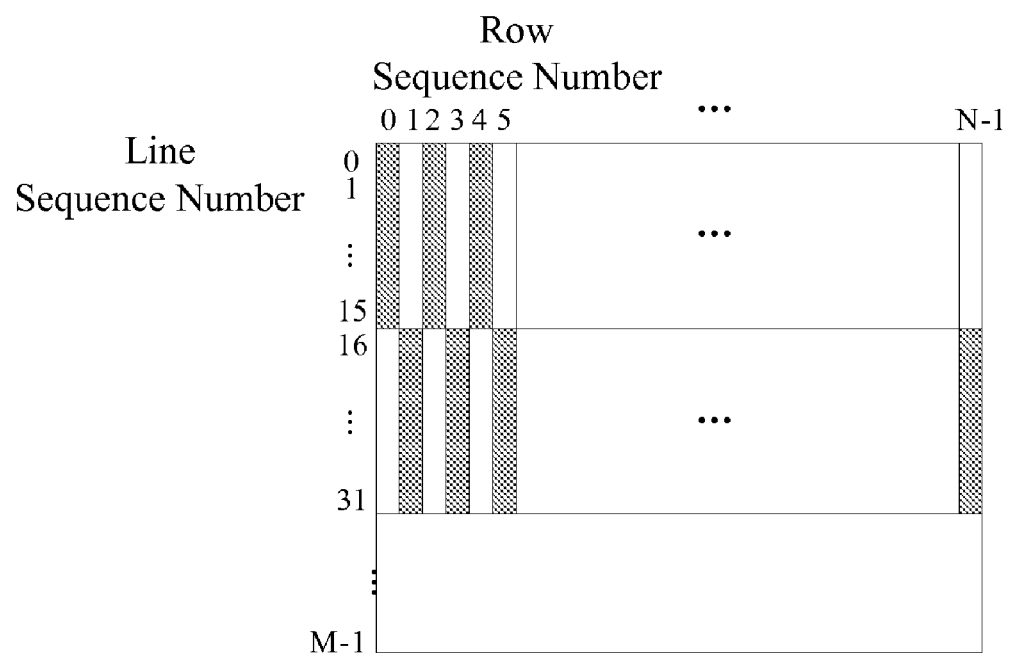

Firstly, the combined frame is divided into a plurality of pixel blocks of 16 lines*1 row, illustrated in FIG. 3. Usually, the line number M and the row number N of the combined frame are a multiple of 16. If the line number M is not a multiple of 16, the remainder is ignored.

Secondly, an energy ratio, defined as P8Raito, of each of the pixel blocks means the energy of a highest frequency component in the total energy of the whole frequencies except for the D.C. component, which is calculated according to following formula (1).

$$P8\text{Ratio} = \frac{|P(8)|^2}{\sum_{K=1}^{15} |P(K)|^2} \quad (1)$$

where P(K) represents the frequency characteristics of p(n) and is calculated according to the Fourier transform (e.g., P(K)=FFT(p(n))), wherein K=0, 1, . . . , 15, p(n) is the value of each of the pixels in each pixel block, n=0, 1, . . . , 15. In one embodiment, the value of pixel is a brightness component Y in a YUV image or a green component G in a RGB image. Correspondingly, P(8) represents the highest frequency component in the frequency characteristics and is calculated according to the following formula $$P(8) = \sum_{n=0}^{15} p(n) \cdot (-1)^n \cdot \sum_{K=1}^{15} |P(K)|^2$$

which represents the total energy of a whole frequency except for the DC component. $|P(8)|^2$ represents the energy of the highest frequency component. However, it needs to execute 16 points FFT (i.e., Fast Fourier Transform) operation for 16 pixels of the pixel block.

To reduce the computations in formula (1), the following operations are performed. Because $$\sum_{K=0}^{15} |P(K)|^2 = 16 \cdot \sum_{n=0}^{15} p^2(n) \text{ and } P(0) = \sum_{n=0}^{15} p(n),$$

so $$\sum_{K=1}^{15} |P(K)|^2 = \sum_{K=0}^{15} |P(K)|^2 - |P(0)|^2 = 16 \cdot \sum_{n=0}^{15} p^2(n) - \left(\sum_{n=0}^{15} p(n)\right)^2,$$

the formula (1) is transformed into the following formula (2).

$$P8\text{Ratio} = \frac{\left(\sum_{n=0}^{15} p(n) \cdot (-1)^n\right)^2}{16 \cdot \sum_{n=0}^{15} p^2(n) - \left(\sum_{n=0}^{15} p(n)\right)^2} \quad (2)$$

Now there only need 18 multiplications in formula (2). For the division operation in formula (2), it could be minimized through a formula transformation. For example, comparing P8Ratio with P8TTHR (a ratio threshold) could be converted into comparing molecular of the formula (2) with the arithmetic product among the denominator of the formula (2) and P8TTHR. Thus, the computation complexity is greatly reduced.

Thirdly, P8Raito of each micro block is compared with P8RTHR which is preset between 0 and 1 by the operator. Whether the calculated P8Raito of each micro block exceeds beyond the ratio threshold P8RTHR is determined. If YES, it concludes that there is a combing phenomenon on the pixel block, otherwise it concludes that there is no combing phenomenon on the pixel block.

Finally, the number of the pixel block having the combing phenomenon is recorded and whether the number exceeds beyond the comb block threshold, which is preset between 0 and total block number, is determined. If yes, it concludes that the combined frame has s combing phenomenon, otherwise, it concludes that the combined frame has no combing phenomenon.

In order to further reduce the computation and accelerate the combing detecting speed, in one embodiment, only some of the pixel blocks of the whole frame are detected. Accordingly, the comb detecting mode is divided into a FULL mode which all pixel blocks are determined, a ½ mode which a half of the pixel blocks are determined, a ¼ mode which a quarter of the pixel blocks are determined, a ⅛ mode which one eighth of the pixel blocks are determined. Other modes are also possible depending on implementation. For example, the ½ mode is illustrated on FIG. 3, the shielded blocks are chosen to calculate P8Ratio.

Figure 4:
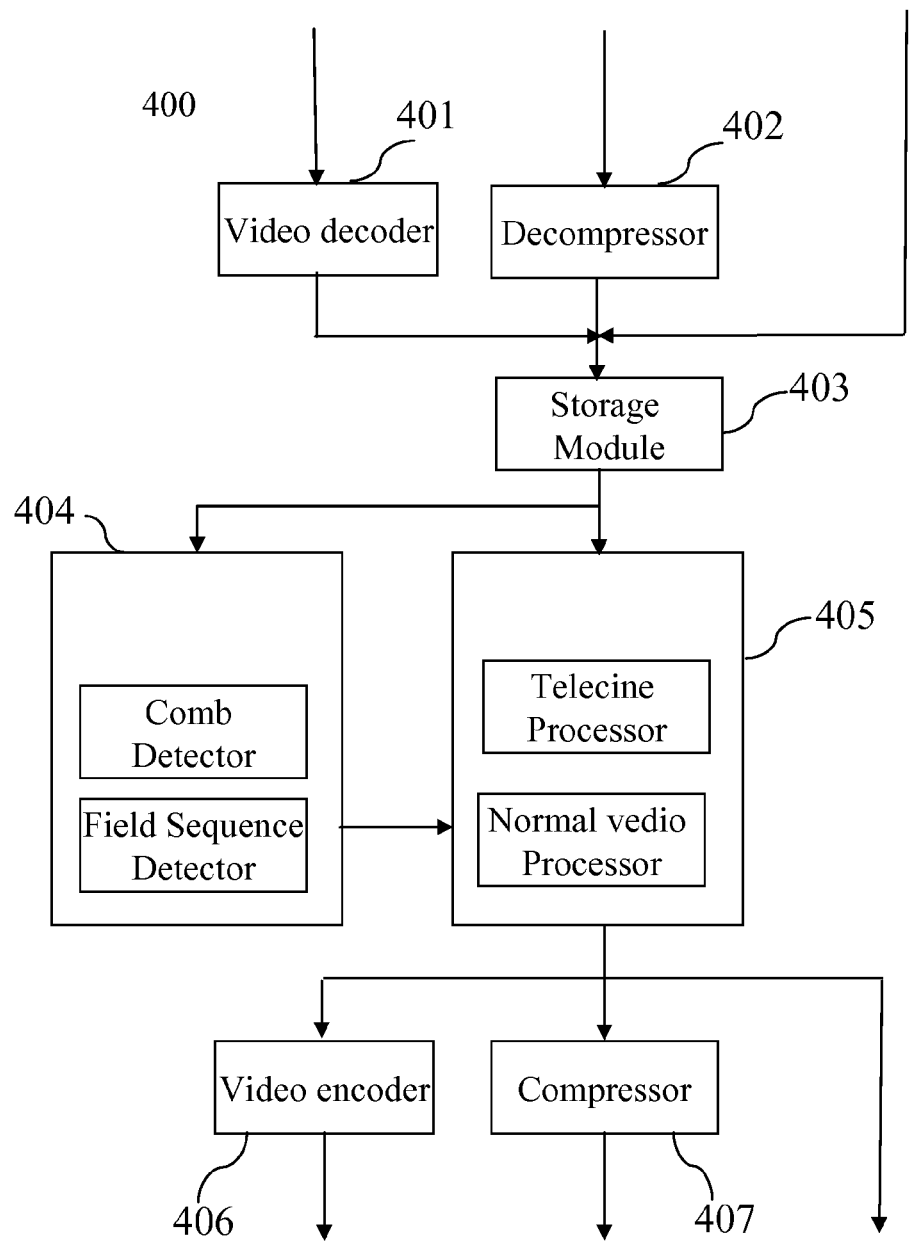
FIG. 4 is a block diagram showing an interlacing device in accordance with one embodiment of the present invention.

The present invention further provides a digital video de-interlacing device for detecting a pulldown field sequence. Referring to FIG. 4, there shows a block diagram 400 of an exemplary digital video de-interlacing device. The device 400 comprises a video decoder 401, a decompressor 402, a storage module 403, a detector 404, a de-interlacing module 405, a video encoder 406 and a compressor 407.

The video decoder 401 is provided for converting an interlaced scan analog signal coming from an external source to an interlaced scan digital signal. The decompressor 402 is provided for decompressing a compressed interlaced scan digital signal coming from the external source. The storage module 403 is configured for receiving and buffering the interlaced scan digital signal from the video decoder 401, the decompressor 402 or the external source. Depending on implementation, the storage module 403 may buffer 2-4 field data and output the data to the detector 404 and the de-interlacing module 405 in a first-in-first-out (FIFO) order. The field data buffered in the storage module 403 may be the values of the pixels, which may be the brightness values (Y) of pixels in a YUV image or color values of pixels in an RGB image or other image formats.

The detector 404 is configured to determine whether the interlacing scan digital signal from the storage module 403 is a normal field sequence or a pulldown field sequence and informs the de-interlacing module 405 of the detecting result by a detecting flag. In one embodiment, if the interlacing scan digital signal is determined as the normal field sequence, the detecting flag may be set to 1. On the contrary, if the interlacing scan signal is determined as the pulldown field sequence, the detecting flag signal may be set to 0. Specifically, the detector 404 comprises a comb detector and a pulldown sequence detector. The pulldown sequence detector may be implemented in accordance with the process 200 of FIG. 2 to distinguish the pulldown field sequence from the normal field sequence and generate the detecting flag. The comb detector is implemented, as described above, to detect whether the combined frame has a combing phenomenon.

According to the detecting flag provided by the detector 404, the de-interlacing module 405 chooses a suitable de-interlacing method in real time to de-interlace the interlaced scan digital signal from the storage module 403 in order to improve the image quality and output the progressive scan digital signal. The de-interlacing module 405 comprises a telecine processor and a normal video processor.

If the detecting flag from the detector 404 indicates "pulldown field sequence", the interlaced scan video stream from the storage module 403 is forwarded to the telecine processor. The telecine processor de-interlaces the pulldown field sequence into the progressive scan digital signal according to the characteristics of the pulldown field sequence. In a preferred embodiment, the telecine processor may be able to further select a corresponding method to de-interlace the pulldown field sequence according to the type of pulldown field sequence, such as 3:2 pulldown field sequence or 2:2 pulldown field sequence, etc.

If the detecting flag from the detector 404 indicates "normal field sequence", the interlaced scan video stream from the storage module 403 is forwarded to the normal video processor. The normal video processor de-interlaces the normal field sequence into the progressive scan digital signal according to characteristics of the normal field sequence.

Finally, if a progressive scan analog signal is required, the progressive scan digital signal from the de-interlacing module 405 will be converted by a video encoder 406. If a compressed progressive scan digital signal is required, the progressive scan digital signal from the de-interlacing module 405 will be compressed by a compressor 407. In one embodiment, the progressive scan digital signal may be directly obtained from the de-interlacing module 405.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

What is claimed is:

1. A method for detecting a pulldown field sequence, the method comprising:
   receiving a field sequence;
   combining two adjacent fields into one frame;
   detecting whether the combined frame has a combing phenomenon;
   if there is such a combing phenomenon,
      determining a number of how many times the combing phenomenon occurs continuously in the combined frame;
      determining the field sequence to be a normal field sequence or a pulldown field sequence according to the number.

2. The method as claimed in claim 1, wherein said detecting whether the combined frame has a combing phenomenon comprises:
   dividing the combined frame into a plurality of pixel blocks;
   calculating an energy ratio of each of at least some of the pixel blocks, wherein the energy ratio is defined to be an energy of a highest frequency in a total energy of whole frequencies in one pixel block;
   determining whether the energy ratio is greater than or equal to a ratio threshold;
   if the energy ratio is greater than or equal to the ratio threshold, concluding that there is a combing phenomenon in the pixel block;
   otherwise, concluding that there is no combing phenomenon in the pixel block;
   recording a number of the pixel blocks that have the combing phenomenon; and
   determining whether the number of the pixel blocks is greater than or equal to a comb block threshold; and
   If the number of the pixel blocks is greater than or equal to the comb block threshold,
      concluding that the combined frame has the combing phenomenon;
      otherwise, concluding that the combined frame has no combing phenomenon.

3. The method as claimed in claim 2, wherein each of at least some of the pixel blocks has a size of 16 line by 1 row, said calculating an energy ratio of each of at least some of the pixel blocks is performed according to a formula:

$$P8\text{Ratio} = \frac{|P(8)|^2}{\sum_{K=1}^{15} |P(K)|^2}$$

where $P(K)$ represents frequency characteristics of $p(n)$ and is calculated according to the Fourier transform $P(K)=\text{FFT}(p(n))$, $K=0, 1, \ldots, 15$, and $p(n)$ is a value of a pixel at $n=0, 1, \ldots, 15$, in a pixel block, $P(8)$ represents a component having the highest frequency in the frequency characteristics, $$\sum_{K=1}^{15} |P(K)|^2$$

represents the total energy of the whole frequencies, $|P(8)|^2$ represents the energy of the highest frequency component.

4. The method as claimed in claim 3, wherein the formula is transformed into another formula:

$$P8\text{Ratio} = \frac{\left(\sum_{n=0}^{15} p(n) \cdot (-1)^n\right)^2}{16 \cdot \sum_{n=0}^{15} p^2(n) - \left(\sum_{n=0}^{15} p(n)\right)^2}.$$

5. The method as claimed in claim 1, wherein said determining the field sequence to be a normal field sequence or a pulldown field sequence according to the number is performed by:
   comparing the number with a corresponding rule of combing phenomenon occurring in the pulldown field sequence;
   if the number matches with the corresponding rule, the field sequence is determined as the pulldown field sequence;
   otherwise, the field sequence is determined as the normal field sequence.

6. The method as claimed in claim 1, further comprising:
   recording cycle times of the combing phenomenon occurring in the combined frames if the number matches with the corresponding rule.

7. The method as claimed in claim 6, wherein said determining the field sequence to be a normal field sequence or a pulldown field sequence according to the number comprises:
   determining whether the cycle times of the combing phenomenon occurring in the combined frames is greater than or equal to a threshold predetermined for the pulldown field sequence;
   if the cycle times of the combing phenomenon occurring in the combined frames is greater than or equal to the threshold predetermined for the pulldown field sequence, the field sequence is determined as the pulldown field sequence, otherwise, the field sequence is determined as the normal field sequence.

8. The method as claimed in claim 1, wherein said determining the field sequence to be a normal field sequence or a pulldown field sequence according to the number comprises is performed by:
   comparing the number with a corresponding comb occurring rule of the normal field sequence;

if the number matches with the corresponding comb occurring rule, the field sequence is determined as the normal field sequence;

otherwise, the field sequence is determined as the pulldown field sequence.

9. The method as claimed in claim 1, further comprising:

recording cycle times of the combing phenomenon occurring in the combined frame if the number matches with the a corresponding comb occurring rule of the normal field sequence; and wherein said determining the field sequence comprises:

determining whether the cycles times of the rule comb occurring on the combined frames is greater than or equal to a threshold predefined for the normal field sequence;

if yes, the field sequence is determined as the normal field sequence;

otherwise, the field sequence is determined as the pulldown field sequence.

10. The method as claimed in claim 1, wherein the pulldown field sequence is one of a 2:2 pulldown field sequence, a 3:2 pulldown field sequence, a 3:3 pulldown field sequence or a 24:1 pulldown field sequence.

11. A video de-interlacing device, the device comprising:

a storage module for buffering an interlaced scan signal;

a detector for determining the interlacing scan signal from the storage module is whether a normal field sequence or a pulldown field sequence;

a de-interlacing module for de-interlacing the interlaced scan signal from the storage module into a progressive scan signal, the detector informing the de-interlacing module of determined result, and the de-interlacing module selecting corresponding ways for the normal field sequence and the pulldown field sequence; and wherein the detector determines the interlacing scan signal by: receiving a field sequence orderly; combining two adjacent fields into one frame; detecting whether combined frames have comb; obtaining a rule of comb occurring on the combined frames; determining the field sequence as whether a normal field sequence or a pulldown field sequence according to the rule of comb occurring on the combined frames.

12. A video de-interlacing method, the method comprising:

receiving a field sequence;

combining two adjacent fields into one combined frame;

detecting whether the combined frame has a combing phenomenon;

if the combined frame has the combing phenomenon, obtaining a rule of comb occurring on the combined frame;

determining the field sequence to be a normal field sequence or a pulldown field sequence according to the rule of comb occurring on the combined frame;

de-interlacing the field sequence according to a type of the field sequence.

\* \* \* \* \*